Figure 4:
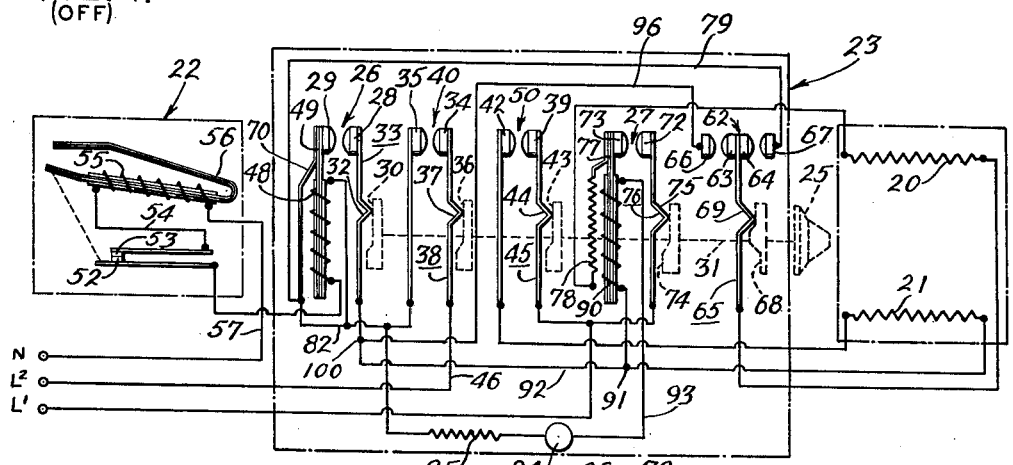

Jan. 15, 1963  C. R. TURNER ETAL  3,073,938
APPARATUS FOR REGULATING OVEN TEMPERATURES
Filed April 30, 1957  5 Sheets-Sheet 1
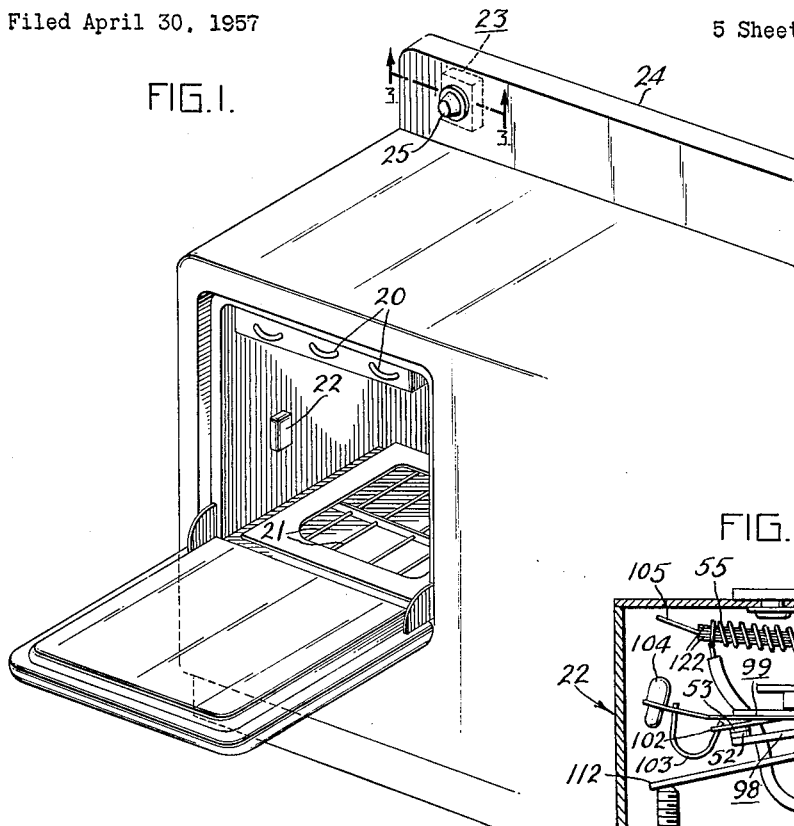
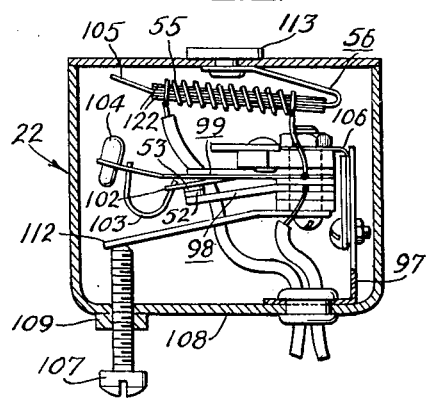
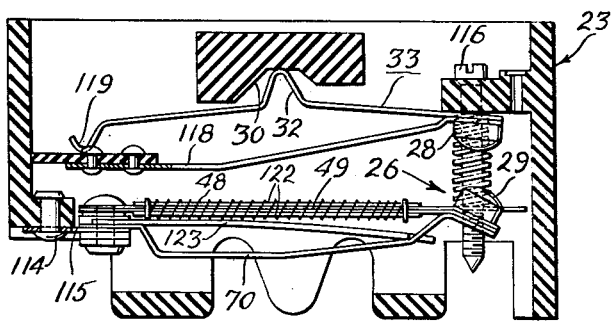
INVENTORS:
CHARLES R. TURNER
DANIEL E. CLAPP
BY Howson & Howson
ATTYS.

Jan. 15, 1963

C. R. TURNER ETAL 3,073,938

APPARATUS FOR REGULATING OVEN TEMPERATURES

Filed April 30, 1957

5 Sheets-Sheet 2

(OFF)

(BROIL)

(BAKE)

INVENTORS:
CHARLES R. TURNER
DANIEL E. CLAPP
BY
Howson & Howson
ATTYS.

INVENTORS:
CHARLES R. TURNER
DANIEL E. CLAPP
BY Howson & Howson
ATTYS.

Jan. 15, 1963 C. R. TURNER ETAL 3,073,938
APPARATUS FOR REGULATING OVEN TEMPERATURES
Filed April 30, 1957 5 Sheets-Sheet 4

INVENTORS:
CHARLES R. TURNER
DANIEL E. CLAPP
BY Howson & Howson
ATTYS.

Jan. 15, 1963  C. R. TURNER ETAL  3,073,938
APPARATUS FOR REGULATING OVEN TEMPERATURES
Filed April 30, 1957  5 Sheets-Sheet 5

(OFF)

(BROIL)

(BAKE)

INVENTORS:
CHARLES R. TURNER
DANIEL E CLAPP
BY Howson & Howson
ATTYS.

3,073,938
APPARATUS FOR REGULATING OVEN TEMPERATURES
Charles Roger Turner, Springfield Township, Montgomery County, and Daniel E. Clapp, Philadelphia, Pa., assignors to The Proctor-Silex Corporation, a corporation of Pennsylvania
Filed Apr. 30, 1957, Ser. No. 656,123
19 Claims. (Cl. 219—20)

This invention relates to control apparatus for the energization of the heating units of an electric oven, including an electric resistance baking heating unit and a similar broiling heating unit. More particularly, it relates to regulation of the heating units in an oven heating system in which both units are energized simultaneously to preheat the oven rapidly when set for a baking operation, and in which the energization of the baking unit is maintained intermittently under control of the oven thermostat after preheating is completed, while the broiling unit is eliminated as a heating factor except for such limited amount of top heat as may be desired. Other features of the invention relate to protection of the oven against over-heating when the broiling unit alone is energized.

These general aspects have been the subject of considerable research and development, but proposed solutions have left a great deal to be desired. A feature and object of the present invention has accordingly been to provide an apparatus for attaining these results in which outstanding results are achieved in positive control with rapid preheating, accuracy in temperature maintenance, safety, flexibility, simplicity of design and operation, and economy.

A specific object of the invention has been to provide an apparatus capable of controlling all of these functions, with desired selection as to heating rate, heating sequence and combination, energization level and temperature control, with optimum simplicity and effectiveness. Still more specifically, the invention provides an apparatus which requires no latches, circuit connection changes or other complications for attainment of the desired sequence of dual continuous energization followed by intermittent selective energization to provide preheating followed by controlled baking with selected top heat. At the same time, it provides control of broiling through a switch which establishes a selected ratio of on to off time to provide the average rate of heating desired, and operates automatically in case of threat of overheating the oven to reduce this ratio of on to off time.

A further object and feature has been to provide an apparatus capable of performing all of the various functions discussed above, and in which the type and sequence of functions, the ratio of on to off time and the temperature level to be maintained, are established by the single setting of a control handle or knob at a desired point.

Further objects of the invention have been to provide an apparatus having these features in which the entire electrical system will fail safely in case of failure of energization of the control apparatus, and in which the control may be adjusted steplessly through the handle or knob, both with respect to intermittent energization of the broiler heating unit and with respect to the thermostatic temperature level control.

A further object and feature has been to provide separate circuits under control of separate switches for simultaneous energization of the oven heater units, thereby increasing contact life by reducing current carried by the individual pairs of switch contacts.

In the preferred form for practice of the invention, there is provided a thermally-responsive cycling switch for control of the energization of the broiler, or upper electric resistance heating unit. The average energization rate in broiling is established by setting of this switch, i.e., by the degree of its initial overclosure as set by the control handle or knob, and hence by the heating of the switch by load current required to open it. While the circuits through the broiling and baking units are separate, the broiling circuit is established when set for broiling through a further primary control switch which is under the control of oven temperature in response to oven thermostat operation. The cycling switch controlling the broiler unit includes an auxiliary electric resistance switch heater which receives current through a normally short-circuited or disconnected branch connection, when the primary control switch is opened in response to high oven temperature as sensed by the thermostat. The broiler heat is reduced when the thermostat operates to open the primary switch, and this reduced energization will continue during the on and off movements of the primary switch to maintain the oven temperature.

When the control knob or handle is set at a position providing baking instead of broiling, both the upper, or broiler, and lower, or baking, oven heating units will be energized simultaneously until preheating is terminated, the baking heating unit being under the control of the thermostat through the primary control switch discussed above and the broiler heating unit being in a separate circuit controlled by the cycling switch in accordance with its overclosed setting. When the primary control switch is opened in accordance with the thermostatic control, this energizes the normally short-circuited or disconnected auxiliary heater of the cycling switch, and the subsequent operation of the two switches provides a desired percentage of heat from the broiler unit as compared to the baking unit, from the resulting periodic opening and closing of these two switches.

The control knob or handle serves to adjust the relative positions of the switch contacts of both the cycling and primary control switches, to thereby adjust the average rate of energization of the broiler unit and the temperature at which the oven causes opening of the primary control switch, and at the same time it closes other switches necessary to establish the operation corresponding to the control setting. Once this setting is made, however, there is no change in the circuit connections, except for the intermittent opening and closing of the cycling and primary control switches in response to broiler load current and oven temperature as discussed above.

The thermostat includes contacts controlled by a bimetal arm in heat exchange relation to the oven, and these contacts form part of a pilot circuit which includes an electric resistance heater for heating the thermostat bimetal and a second electric resistance heater for heating the bimetal of the primary control switch. The thermostat switch contacts are normally closed, and open in response to heating, and the primary control switch contacts are normally open and are closed, after the cam adjustment toward closed position, in response to heat derived from the pilot circuit. The temperature at which the contacts of the primary switch are opened is therefore determined by its cam setting and is a function of the energization of the pilot circuit which is in turn controlled by the thermostatic effect of the oven heat.

Figure 5:
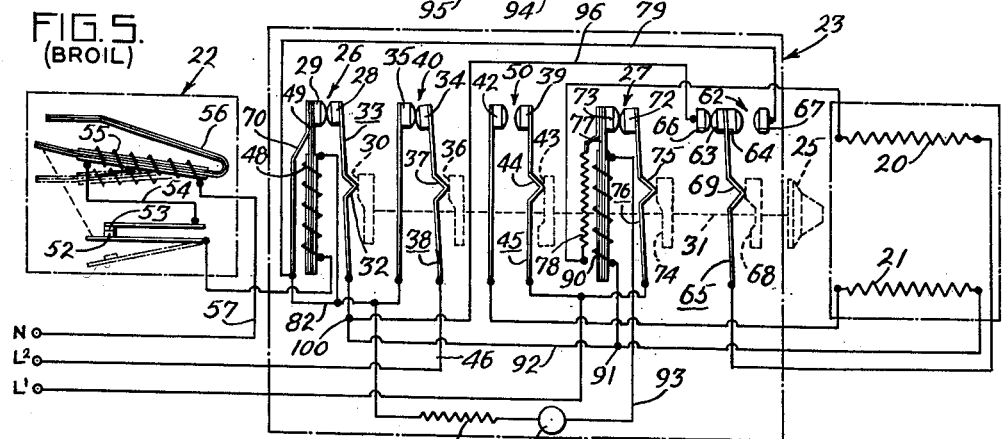
Figure 6:
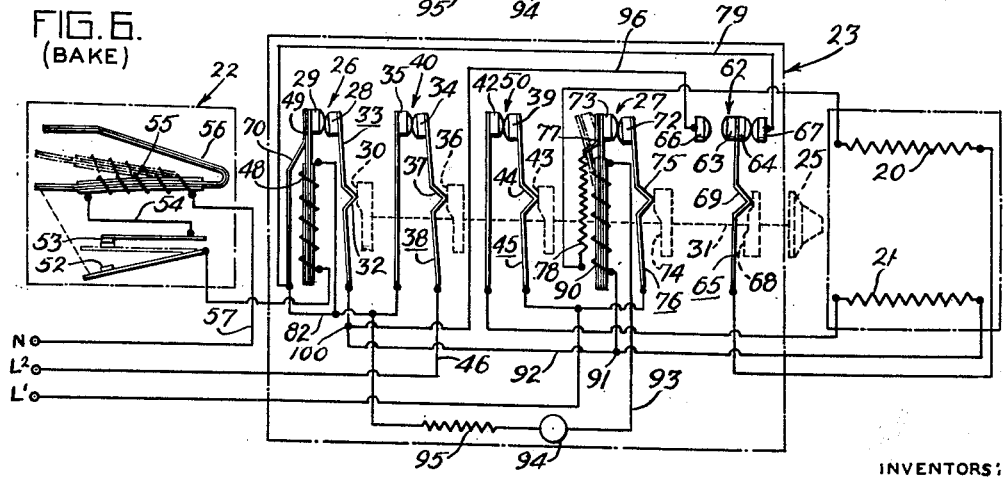
Figure 7:
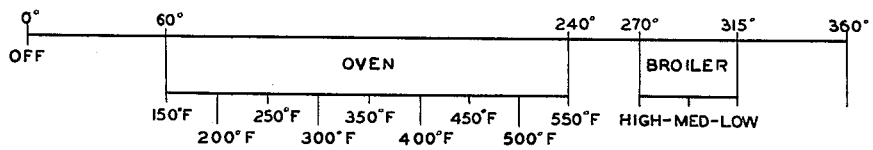
Figure 8:
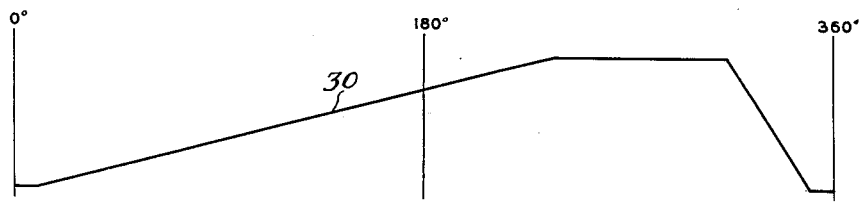
Figure 9:
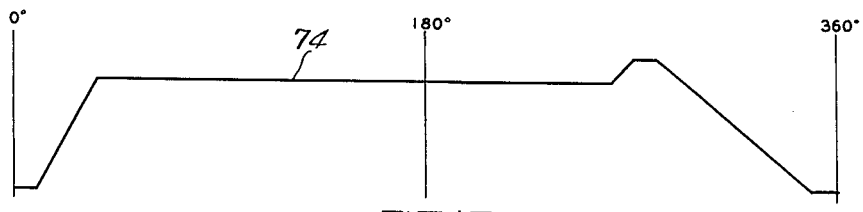
Figure 10:
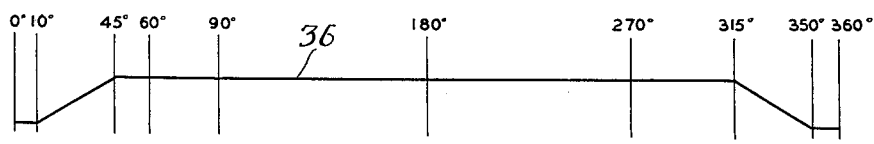
Figure 11:
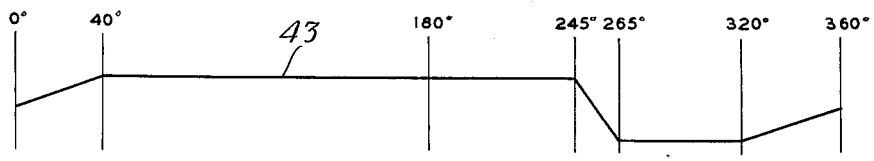
Figure 12:
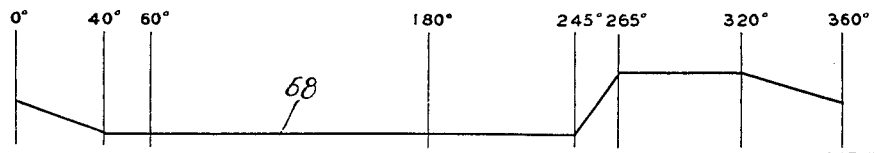
Figure 13:
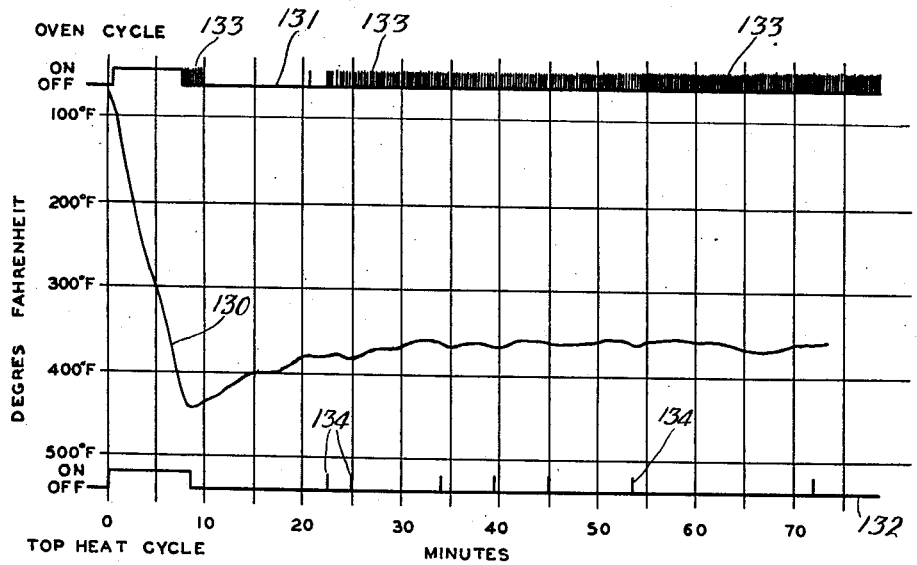
Figure 14:
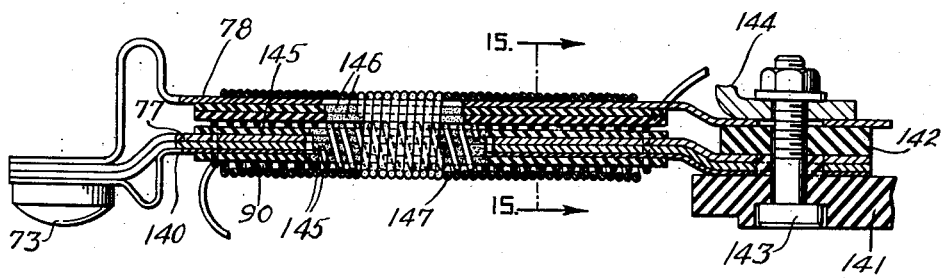
Figure 15:
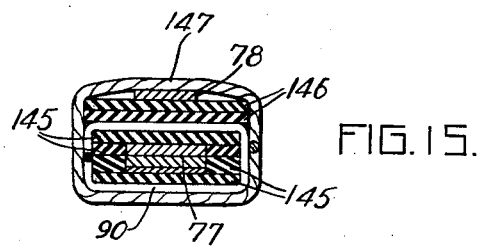

By reason of these and other features of the invention to be described below, excellent and stepless control of the oven with rapid preheating is attained regardless of whether it be set for broiling or baking. Further features and advantages of the invention and the manner in which they have been attained will be evident from reading of the following detailed description in the light of the attached drawing, in which:

FIGURE 1 is a perspective view of a portion of an electric range, showing an oven to which the invention is applied and a control therefor, FIGURE 2 is a central vertical sectional view through the detector and transmitter unit providing the thermostatic mechanism mounted within the oven, FIGURE 3 is an enlarged cross-section on the line 3—3 of FIGURE 1, FIGURE 4 is a diagrammatic view illustrating the various units of the invention in their circuit relationships to each other and to associated circuit and other elements and units of the invention, and showing the parts in the relative postions which they occupy when the control knob is turned to the "off" position, FIGURE 5 is a view corresponding to FIGURE 4 illustrating the positions of the parts when set for broiling, FIGURE 6 is a corresponding view showing the baking setting, FIGURE 7 is a view illustrating the relationship of the angular settings of the control knob to the oven temperatures and cooking functions provided at these settings, FIGURE 8 is a view illustrating the contour of the cam controlling the positions of the receiver contacts, FIGURE 9 is a similar view illustrating the cam contour controlling the positions of the broiler switch contacts, FIGURE 10 is a similar view of the cam contour controlling the positions of a line disconnect contact, FIGURE 11 is a similar view of the cam contour controlling the positions of an auxiliary switch by which the baking circuit is established, FIGURE 12 is a similar view of the cam contour for selecting the broiling or baking operation, FIGURE 13 is a diagrammatic view illustrating the sequence and timing of the energization of the units when set for a baking operation, FIGURE 14 is a longitudinal cross-section through the thermomotive member controlling the cyclic opening and closing of the broiler switch, FIGURE 15 is an enlarged cross-section on the line 15—15 of FIGURE 14, and FIGURES 16–18 are views corresponding to FIGURES 4–6, respectively, and illustrate an alternative embodiment of the invention.

As illustrated in FIGURES 1–6 of the drawing, the control apparatus of the invention may be applied in the form of baking, broiling and measuring circuits including a plurality of switches and related control elements mounted upon an electric range to control the energization of upper and lower electric resistance heaters 20 and 21, respectively, which in this instance are illustrated as the conventional electric resistance heating units interconnected in load circuits to provide broiling or baking, depending upon the control setting.

The basic control units of the system include a detector and transmitter unit 22 mounted within the oven and providing a thermostatic control sensitive to oven heat. This unit senses the information which it thus receives and transmits it through a measuring or pilot circuit to a control unit housed within a casing 23 which is mounted remotely from the oven, upon the splash board 24 of the range as illustrated, or at other convenient location. This control unit includes a knob 25 secured to a shaft 31 extending through the face of the unit, and the position of this shaft controls a plurality of cams which act upon the various cam followers as discussed hereinafter. These various followers and cams are preferably mounted within the single compact casing 23, as illustrated in FIGURE 1, and the cams are formed according to the principle illustrated in the FIGURE 20 of Vogelsberg Patent 2,666,124, as separate concentric face contours upon a single rotary cam member controlled by knob 25. However, they have been illustrated in an exploded relationship in the diagrammatic views of FIGURES 4–6 of the drawing, in order that the circuit relationships of the invention may be clearly indicated.

As illustrated in FIGURES 4–6, the basic units of the invention include, in addition to the detector and transmitter unit 22 mounted within the oven, a receiver and controlling unit 26 and a broiling control unit 27 which, together with other switches and terminal connections mounted within and upon casing 23, control the energization of the heating units 20 and 21.

FIGURE 4 of the drawing illustrates the various switch connections and cam followers in the positions which they occupy when control knob 25 is in the "off" position, and neither of the oven units nor the pilot circuit unit is energized. When control knob 25 is moved to any on position, one result will be to move switch contact 28 of the receiver switch into close proximity to its associated contact 29. This result is attained through the operation of the face cam contour 30 against cam follower 32 of the arm 33 carrying contact 28, and the closeness of approach of contact 28 to contact 29 will depend upon the particular setting of the knob 25 as discussed hereinafter. This movement of the knob 25 into any on position also brings switch contact 34 into switch-closing position against its associated contact 35 of on-off switch 40 through the operation of face cam contour 36 against cam follower 37 of arm 38, and if the setting of the knob is to an oven position to provide a baking operation, it will bring contact 39 against its associated contact 42 of switch 50 by reason of operation of face cam contour 43 against cam follower 44 of arm 45.

The source of electrical energy for this system may be a conventional three wire system including lines L1 and L2 which provide 236 volts when interconnected, and a neutral line N providing 118 volts when connected to either of them. With switch contacts 34 and 35 closed, a pilot circuit is established for the purpose of providing a desired control of the opening of contacts 28 and 29, and runs from line L2 through line 46, switch contacts 34 and 35, electric resistance heater 48 surrounding bimetal arm 49 controlling the position of contact 29, the normally closed contacts 52 and 53 of the detector unit 22, line 54, resistance heater 55 surrounding a portion of the U-shaped bimetal strip 56, and line 57 to the neutral line N. As noted above, cam contour 30 brings contact 28 into close proximity with its associated contact 29 as the result of movement of knob 25 to any one position, and contact 29 will be moved further to the right and into closed relationship to associated contact 28 as illustrated in FIGURES 5 and 6 as the result of heating of bimetal arm 49 through the pilot circuit energization discussed above, since bimetal arm 49 flexes to the right under the influence of heat and operates to open this primary control switch 26 when it cools off. Bimetal arm 56 of the detector unit, on the other hand, operates in the reverse manner to open switch contacts 52 and 53 when heated but to close them as it cools off. Thus, the contacts 52 and 53 are already closed when the apparatus is turned on to permit passage of the pilot circuit current and thus effect closure of switch 26, and the control of the ensuing cooking operation is thenceforth a combined function of the operation of the detector (unit 22) and receiver (unit 26) switches as discussed hereinafter.

Upon closure of the four switches discussed above, current will flow as illustrated in FIGURE 6 from lead L1 through contacts 39 and 42, the oven baking unit 21, switch arm 33, contacts 28 and 29 of switch 26, arm 70, line 82 and switch 40 to return line L2. The baking operation will thus be commenced, and this operation will be maintained continuously until interrupted by the action of the thermostat in causing movement of contact 29 away from its associated contact 28. This interruption of current will thereafter occur intermittently as discussed hereinafter under control of the baking heat to maintian the oven at the desired temperature level.

At the same time that circuit connections are established through the oven baking heating unit 21 as discussed above, a parallel branch circuit is established through broiler heating unit 20, to provide rapid preheating of the oven by simultaneous energization of units 20 and 21, with subsequent intermittent energization of unit 20 for only a fraction of the intermittent energization of unit 21, to provide percentage top heat.

Energization of the broiler unit is under the joint control of the broiler switch 27 and a double throw switch 62 having switch contacts 63 and 64 upon opposite sides of the free end of its arm 65, for circuit connection with contacts 66 and 67 selectively. Arm 65 is biassed toward circuit connection of contact 64 with contact 67, but it may be maintained in the open circuit position of FIGURE 4, moved into the circuit-closing position of FIGURE 5, or be permitted to move into the alternative circuit-closing position of FIGURE 6, depending upon the position of rotation of cam contour 68 against follower 69 of arm 65. When the knob 25 controlling shaft 31 and all of the cam contours of this invention is set to any baking position, switch arm 65 will be in the position illustrated in FIGURE 6.

Contact 72 of switch 27 is also closed against its associated contact 73 by the operation of cam contour 74 against follower 75 of arm 76. This broiler switch 27 is preferably of the type described and claimed in the patents to Vogelsberg, 2,623,137 and Clapp, 2,673,444. It embodies a bimetal arm 77 carrying contact 73 and a heater 78 in circuit with the contacts 72 and 73, this heater 78 being a compression strut and insulation being provided as discussed in those patents to provide the delayed heat transfer between heater strut 78 and bimetal arm 77. When switches 27 and 62 are closed by operation of the control knob 25 to a baking position, a circuit will be established as illustrated in FIGURE 6 from line L1, through arm 76, contacts 72 and 73, heater strut 78, broiler heating unit 20, switch arm 65, contacts 64 and 67, lines 79 and 82 and switch 40 to return line L2. This parallel branch circuit will thus be closed to energize the broiler heater 20 at the same time that the baking circuit is energized through switches 50 and 26 and oven baking heater 21 as discussed above, with the result that rapid preheating will be accomplished through this dual energization. Contact 72 is rather strongly overclosed against contact 73 at all settings of knob 25 and cam contour 74 providing the baking circuit connections. Switch 27 will not therefore ordinarily cycle during this preheating, and energization of broiler heater 20 will be maintained continuously until interrupted by thermostat operation as discussed hereinafter.

As noted above, contacts 29 and 28 are also overclosed to the position of FIGURE 6 upon movement of knob 25 carrying shaft 31 and contour 30 to the baking position, and energization of the pilot circuit through closure of switch 40 will also be continuous until this circuit is opened in response to oven heat. The oven unit 21 will therefore also be fully energized continuously until the desired oven temperature is reached.

When, as the result of heat from the oven and resistance heater 55, the temperature of the bimetal thermomotive element 56 reaches a predetermined point depending upon its inherent characteristics and initial calibration, the contacts 52 and 53 will be opened to break the pilot circuit through resistance heaters 48 and 55, with the result that thermomotive members 49 and 56 will again flex toward their initial positions in which contacts 52 and 53 are maintained closed and contacts 28 and 29 open.

This initial flexing of bimetal 49 toward open contact position will not, however, ordinarily effect opening of the load circuit through contacts 28 and 29 and oven unit 21, since these contacts are ordinarily overclosed by the adjustment of arm 33 and the heating effect of the heater 48 to an extent which is not overcome by the cooling due to the duration of interruption of current through contacts 52 and 53. After a brief period during which heat is derived by thermomotive bimetal 56 only from the oven, this bimetal will have cooled off to a point at which contacts 52 and 53 are again closed, and the heating of bimetals 49 and 56 by heaters 48 and 55 is resumed.

From the foregoing discussion, it will be seen that bimetals 49 and 56 will be flexed in opposite directions in unison as the oven temperature is increased by continuous energization of heaters 20 and 21. As the temperature desired to be maintained is approached by the oven, however, the intervals of current interruption through contacts 52 and 53 and consequently the intervals during which resistance heaters 48 and 55 are de-energized, become longer and longer. Bimetal 49 is therefore progressively cooled off step-wise as the result of these interruptions, and as the temperature of the oven approaches the temperature set by the position of arm 33 in response to the setting of control knob 25, contacts 28 and 29 will be opened for the first time. The heating operation performed by oven heating unit 21 will therefore be interrupted. After a brief interruption, the heating of bimetal 56 by heater 55 is resumed as the consequence of flexing of bimetal 56 into position closing contacts 52 and 53. The cycling of the resulting circuit including heaters 48 and 55 continues in this manner and the interruptions of heat energy to unit 21 become progressively longer as the selected temperature level of the oven is approached. By the time the control temperature is reached, the available rate of energization of the resistance heater 21 through contacts 28 and 29 will have been decreased by the increasing length of the "off" periods to such extent that there may be little or no overshoot of the oven temperature. Once the desired control temperature is attained, this temperature will be closely maintained by the cycling of the contacts 52 and 53 on the one hand and 28 and 29 on the other, according to the same principles discussed above for the operation during the approach to the control temperature.

In connection with the control of the energization of heater 43 and opening of contacts 28 and 29 in response to cooling off of bimetal 49, it should be noted that this not only provides outstandingly effective control but that it also causes the unit to fail safely in case of any break in the circuit, since closure of the load circuit through contacts 28 and 29 can result only from flow of current through the measuring or pilot circuit.

The interruption of current through the oven baking heater 21 by opening of switch 26 in response to thermostat operation also results in opening of switch 27. This result is obtained through energization of a further switch heater 90 associated with the bimetal arm 77 of switch 27. This heater 90 lies in close thermal association with the bimetal arm 77, being separated from that arm by less insulation than is the outside or strut heater 78 of the switch 27. The heater 90 is a part of a branch circuit extending from circuit connection 91 through line 92, the heater 90, line 93, voltage regulator 94 or equivalent, and resistor 95 to switch 40 and line L2. The voltage regulator 94 may be any commercially available unit capable of providing substantially uniform voltage or average wattage in the branch circuit, as for example a bimetal-operated snap switch thermally controlled by line current through the switch.

The resistance in this branch circuit including switch heater 90, voltage regulator 94 and resistor 95, is sufficiently high to preclude passage of any substantial amount of current through this branch circuit so long as the contacts 28 and 29 of switch 26 are closed, and switch 26 therefore short circuits this branch circuit including the heater 90 except when it is open. Thus, while a small amount of current will flow through switch heater 90 at all times when the switch contacts are in the positions illustrated in FIGURE 6, this will have no significant effect upon the operation of switch 27 until such time as the current through this branch circuit is greatly increased by the breaking of the short circuit through switch 26 incident to the opening of the contacts 28 and 29 in response to oven heat as discussed above. When heater 90 is strongly energized by breaking of the short circuit through switch 26 in response to oven heat, however, the resulting rapid heating of bimetal arm 27 will cause the contact 73 of switch 27 to move rather quickly away from its associated contact 72, and the amount of heat thus derived by bimetal arm 77 will ordinarily cause these contacts to be maintained open for an even greater length of time than contacts 28 and 29 of receiver switch 26, before moving back into the closed position of FIGURE 6 in response to cooling of bimetal arm 77. When contacts 29 and 28 of switch 26 are again closed, this will of course short circuit switch heater 90 again, with the result that any substantial heating of bimetal arm 77 of switch 27 will be derived from broiler load circuit passing through heater strut 78 after switch 27 is reclosed. The switches 26 and 27 will thereafter be moved between open and closed positions in response to oven heat in accordance with these principles, the ratio of on to off time of contacts 72 and 73 of switch 27 being greatly diminished as the result of energization of heater 90 by opening of switch 26, with the consequence that switch 27 is closed only during intervals providing a desired percentage of heat through broiler 20 as compared with baking unit 21, once switch 26 begins to open and close in response to oven heat.

The system as discussed above may, in the alternative, be used for broiling instead of baking, merely by setting knob 25 to a different angular position, and when so set it provides protection against fire or other heat damage which might otherwise be encountered during broiling. This protection is the result of the use of switch 26 and the parallel circuit through switch heater 90 for protection against over-heating when broiling.

When control knob 21 is set to a broiling position the switches move to the positions of FIGURE 5. Switch 40 is closed and switch 27 is overclosed to an extent providing cycling in response to load current through heater strut 78 with a ratio of on to off time providing the desired broiler heating level. Contact 28 of switch 26 is moved into close proximity to contact 29 and when contact 29 moves to the right in response to pilot circuit energization of heater 48, this effects rather strong overclosure of switch 26, with the result that this switch will not reopen except in response to thermostatic action as discussed above resulting from excessive oven heat. Contacts 63 and 66 of double throw switch 65 will be closed through operation of cam contour 68 against cam follower 65 of arm 65, but the contacts of switch 50 will remain open.

With the switches at these settings, load current will flow through the circuit of FIGURE 5 from L1 through switch 27, broiler heater unit 20, contacts 63 and 66 of switch 62, line 96, arm 33, contacts 28 and 29 and arm 70 of switch 26, and switch 40 to line 12, and the resulting energization of the broiler will be intermittent unless the control knob is set to a very high broiler temperature setting. No current will flow through the oven baking unit 21, since the switch 50 controlling energization of this unit remains open. If the temperature should become excessive in performance of broiling at these settings, this will cause switch 26 to open in response to the oven temperature and pilot circuit in the same manner discussed above in consideration of the baking operation, with the consequence that the return line through switch 26 and line 82 will be broken. The circuit provides an alternative return line from connection 100 through line 92, heater 90, line 93, voltage regulator 94 and resistor 95, as discussed above in consideration of the baking operation. Thus, when the switch 26 is opened in response to excessive heat, this normally short circuited branch through the inner switch heater 90 will be energized with the result that heat derived from the inner switch heater 90 will cause switch 27 to be opened rather rapidly. This breaks the load circuit through broiler heater unit 20 and heater 90, and switch 27 is thus again closed as the result of deenergization of strut heater 78 and inside heater 90 of switch 27. It will be evident that the oven is protected against attainment of temperatures higher than provided by the overclosure setting of switch 26, by the intermittent opening and closing of switches 26 and 27 in response to heat derived from heaters 48, 78 and 90 in accordance with the principles discussed above.

Important advantages are attained by utilization of a snap switch of the type illustrated in Turner Patent 2,691,082 as the controlling member for the switch contacts 52 and 53 of the transmitter unit 22 (see FIGURE 2).

The switch contacts 52 and 53 of this unit are supported upon arms 98 and 99, respectively, the contact 53 being supported by a lancing 102 from arm 99. The arm 99 and lancing 102 carry opposite ends of a loop spring 103, and an actuating button 104 of insulating material is also carried by arm 99. This actuating button underlies an extension 105 of the outer branch of the bimetal 56. These parts are supported from post 97 and associated structure through a spring hinge 106, and the pivotally supported position of the parts, including actuating button 104, is initially calibrated or adjusted by a screw 107 secured in adjusted position upon the base 108 of the switch-supporting structure by nut 109. The upper end of this screw abuts the underside of a bimetal arm 112, which is held in contact with the inner end of the screw. The essential features of this switch are similar to those described in Turner Patent 2,691,082, and an understanding of the operation of the switch can readily be had from consideration of that patent. The bimetal arm 112 serves, due to flexing under the influence of heat, to compensate for changes in ambient temperature within the chamber formed within housing 22, the underside of this arm 112 being the high expansion side. The inside portion of the U-shaped bimetal strip 56 is the high expansion side, with the consequence that, upon application of heat to this bimetal, either by conduction from the oven through the thermally conductive button 113 projecting into the main body of the oven, or by heat derived from resistance heater 55, the extension 105 of bimetal strip 56 moves outwardly until it ultimately contacts the actuating button 104. When the resulting movement of the actuating button 104 has continued to a point bringing loop spring 103 beyond its switch-opening position, the contacts 52 and 53 will be sprung to open position.

Further important features of advantage are attained in practice of the invention by certain details of construction of the switch actuating mechanism of the receiver unit 26. As illustrated in FIGURE 3, the bimetal arm 49 carrying switch contact 29 is mounted for flexing movement about an anchor in the form of a rivet 114 at its left end. This rivet is secured to the supporting casing structure 23 through a spring hinge member 115, and the position of this spring hinge may be adjusted by a calibrating screw 116 after the fashion illustrated in FIGURE 7 of Hortman Patent 2,697,156. There is also secured to the rivet 114 and to the opposite end of bimetal strip 49 adjacent to the contact 29, the resilient metal conductor strip 70 which forms a part of the load circuit through contacts 28 and 29 and the oven heating unit 21 when these contacts are closed as discussed above. The strip 70 is a relatively light metal member of substantially less mass than the bimetal 49, and it is secured in position to place it under tension in its association with the bimetal strip as the bimetal strip flexes to permit closure of the contacts. There will therefore be a tendency, on the part of this strip 70, to resist movement of contact 29 toward contact 28. This tendency will be relieved however, by the thermomotive expansion of strip 70, once the contacts have been closed and this strip is heated by the load current passing through it. Once the load circuit has been opened, however, due to cooling of bimetal 49, the resulting contraction of strip 70 will tend to cause still cleaner separation of the contacts. The thermomotive action of strip 70 therefore produces more positive switch action, and it also restrains initial opening of contact 29 and thus permits a close approach to the temperature desired to be maintained, before cycling of contacts 28 and 29 begins. This strip may be made of any material having the desired resilience, fatigue strength and other physical properties, together with sufficient electrical resistivity to generate the desired heating within the strip. It may, for example, be a copper-nickel alloy.

The tension strip 70 is located sufficiently far from the bimetal 49 to avoid substantial interchange of heat between these members, so that the thermomotive effect of the tension strip 70 is solely one of first offsetting and then accentuating the opening and closing forces applied to the contacts 28 and 29, due to its successive expansion and contraction as discussed above. By reason of the provision of tension strip 70, it is possible to obtain, in the design of this apparatus, an operation in which the temperature transmitted by the oven through antenna 113 to the transmitter apparatus approaches very closely to the desired temperature to be maintained, before the "on" and "off" cycling of the contacts 28 and 29 is commenced. This enables us to obtain very rapid heating of the unit until the desired control temperature has been substantially attained, and then to approach that temperature at a decelerating rate until the desired condition is attained and thereafter maintained.

As noted above, the setting of contact 28 and its associated arm 33 is controlled in position by the face cam member 30 (FIGS. 3 and 8), and the arm 33 is maintained in cam-following relation to this cam by a spring 118, the free end 119 of arm 33 serving as a fulcrum for this adjustment. The arm 33 is preferably provided as a bimetal with the under side as illustrated in FIGURE 3 the high expansion side, and the under side of bimetal strip 49 is also the high expansion side. As a consequence of these facts, the arm 33 serves as an ambient temperature compensator for the bimetal strip 49, with the result that the erratic operation which would otherwise be created by ambient temperature changes at the location of control casing 23 is thus eliminated. An insulating strip 123 is preferably positioned between the tension strip 70 and the electric heater winding 48 about bimetal 49, in order to avoid any chance of short circuiting, and electric insulation is also provided at opposite sides of bimetal strips 49 (FIGURE 3) and 56 (FIGURE 2) in the form of mica strips 122 about which the heater turns 48 and 55 are wound.

FIGURES 7–12 of the drawing illustrate the relation of control knob 25 to the various cam contours associated therewith for simultaneous rotation to obtain the desired temperature settings. In these figures and the following discussion when we refer to temperatures the letter "F" will follow the degree mark "°". Otherwise, all figures associated with this mark refer to degrees of counterclockwise rotation of the control knob and cams from their zero settings. As illustrated in FIGURE 7, if it be desired to produce and maintain a low baking temperature of 150° F., the knob will be turned from its "off" or 0° setting through a counterclockwise angle of 60°. By comparison of FIGURE 7 with FIGURES 8–12, it will be seen that this causes closure of switches 26, 27, 40 and 50, by actuation through their respective cams 30, 74, 36 and 43, and that it also moves cam 68 from the position of FIGURE 4, in which switch 62 is open, to the position of FIGURE 6, in which contacts 64 and 67 of that switch are closed, so that the broiling unit 20 and baking unit 21 are simultaneously energized to effect rapid preheating. Since switch 27 is rather strongly overclosed by cam 74 at this setting, there will be little or no cycling of this switch during preheating, but it will open in response to the opening of the contacts of switch 26 as discussed hereinafter at the conclusion of preheating. The oven will thus be heated up rapidly by simultaneous energization of units 20 and 21. When switch 26 is opened in response to oven temperature at completion of preheating as discussed above, this causes energization of heater 90, with the consequence that switch 27 will be maintained closed a smaller proportion of the time than switch 26 in the ensuing heating operation to maintain the oven at a uniform temperature.

FIGURE 13 illustrates graphically the results of an operation in which the control knob is set to maintain an oven baking temperature of 385° F. As indicated, the ordinates represent oven temperatures and the abscissae time, and the line 130 illustrates these relationships during the cooking operation. It will be seen that the oven was brought up to the desired temperature in about seven minutes and levelled off to maintain this temperature after a brief overshoot. The line 131 illustrates the sequence of opening and closing of switch 26 to control energization of baking unit 21 and the line 132 gives the same information for the switch 27 controlling the broiler unit 20. The upper portions 133 of line 131 indicate the periods of time during which the baking unit 21 was energized, and the portions 134 of line 132 give this same information for the broiler unit. It will be seen that both units were energized continuously until the oven was brought up to the desired temperature, and that the baking unit was thereafter energized only intermittently and the broiler unit still less frequently to maintain this temperature.

Let us now assume that the operator wishes to perform a broiling operation and to maintain a medium broiling temperature. By reference to FIGURE 7 it will be seen that this requires movement of the control knob to a setting of 292½°, and by reference to FIGURES 8–12 it will be seen that receiver switch 26 will be strongly overclosed by cam 30, while switch 27 will be closed by cam 74 to an intermediate position providing the desired ration of on to off time of this switch. Switch 40 is closed by cam 36 (see FIGURE 10) while switch 50 remains open, as will be evident from the contour of cam 43 as illustrated in FIGURE 11. By reference to the contour of cam 68 in FIGURE 12, it will be seen that contacts 63 and 66 of switch 62 are closed as illustrated in FIGURE 5. As the consequence of these switch closures, the broiling operation will proceed under the safety control of switch 26, as discussed above.

The switch 27 is similar in principle to Vogelsberg Patent 2,623,137 and Clapp Patent 2,673,444, but the effect of the heater strut of those patents is supplemented by heater 90. Further details of the thermomotive arm 140 carrying contact 73 are illustrated in FIGURES 14 and 15. The heater strut 78 and bimetal arm 77 are secured at their ends opposite contact 73 to an insulating support 141, and separated from each other by an insulating spacer 142, and the bolt 143 serves to secure these members to each other and to a lug 144 which serves as a terminal connection for heater strut 78 and contact 73. Insulating strips 145 protect bimetal 77 from contact with heater 90 by which it is surrounded and further insulating strips 146 protect the heater 90 from contact with strut 78. The entire assembly is further secured by a surrounding winding of insulating material, as for example fiberglass cord 147.

Figure 16:
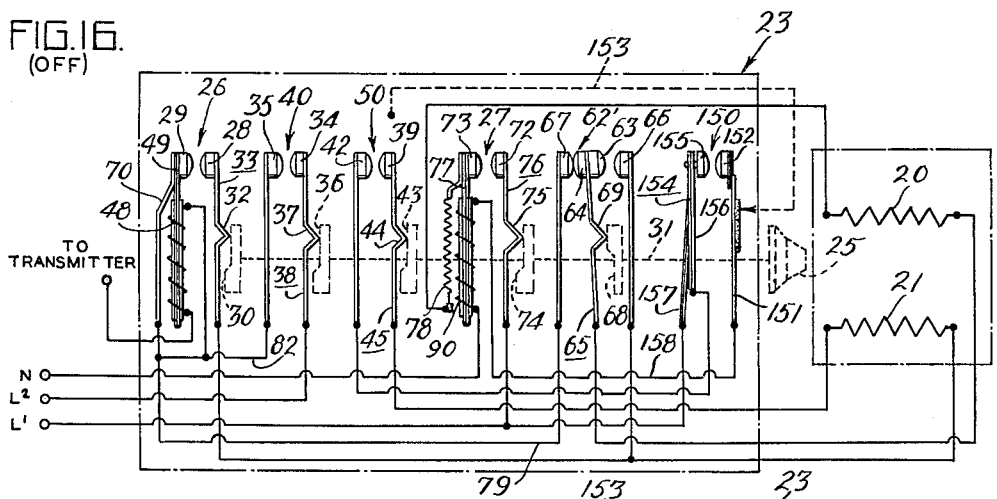
Figure 17:
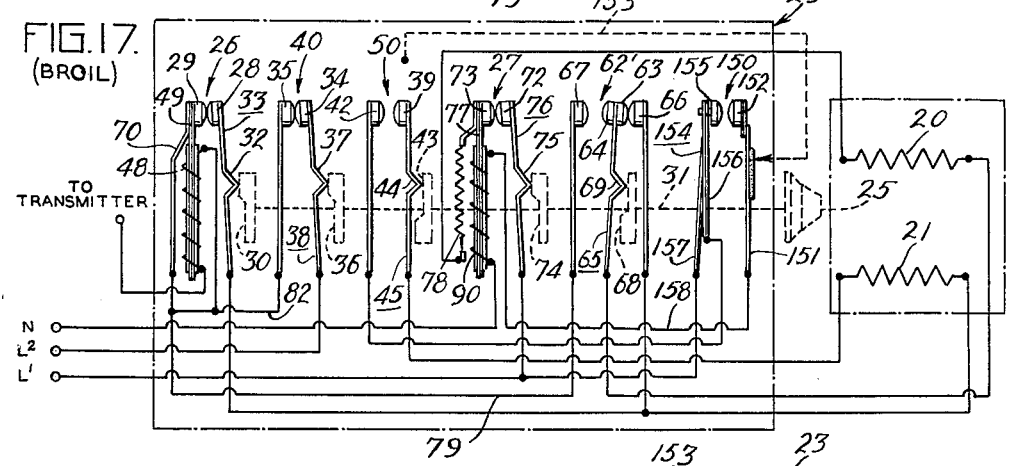
Figure 18:
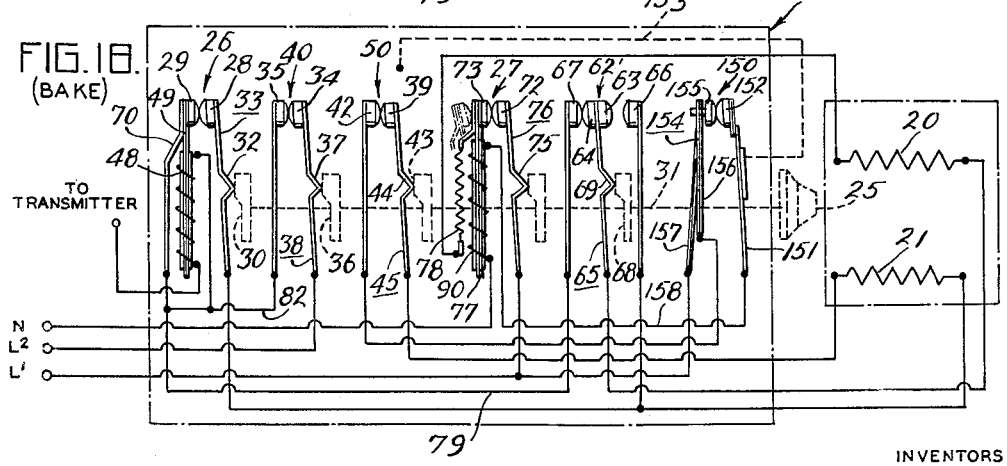

The form of the invention illustrated in FIGURES 16–18 is similar in general to that illustrated in FIGURES 4–6, the principal difference being that a switch 150 is added as a safety precaution against the possibility that the baking unit 21 may be burned out. The switch 150 comprises an arm 151 carrying a switch contact 152, and this arm is moved simultaneously and identically with arm 45 carrying switch contact 39 of switch 50. To effect this, arm 151 may be actuated by a cam and cam follower which are identical with the cam and cam follower 43 and 44, or it may be mechanically interconnected with arm 45 as indicated by the broken line 153, for such simultaneous movement. The opposing arm 154 carrying opposing contact 155 of switch 150 is a U-shaped, current-carrying bimetal with the arms 156 and 157 of its U projecting in opposite directions from the plane of the drawing and electrically connected respectively to contact 42 of switch 50 and to line L1.

Neither of switches 50 and 150 is closed when knob 25 is moved from the off position of FIGURE 16 to a broiling position, as illustrated in FIGURE 17, so the operation in broiling is identical to that described above in connection with FIGURE 5, the rate of broiling being determined by the cycling of switch 27 as controlled by the setting of knob 25, but being under the safety control of switch 26 and detector and transmitter unit 22 (not shown in FIGURES 16–18).

When knob 25 is turned to the baking position of FIGURE 18, current will flow from line L1 through arms 157 and 156 of U-shaped bimetal 154, switch 50, baking unit 21 and switches 26 and 40 to line L2, and the baking unit will therefore be energized under the thermostatic control of switch 26 and transmitter unit 22, exactly as in FIGURE 6, except that bimetal 154 becomes a part of the circuit. The broiling circuit is also established from L1 through switch 27, broiling unit 20, contacts 64 and 67 of switch 62, lines 79 and 82 and switch 40 to L2. Bimetal 154 is designed to flex to the left upon heating and switch 150 will therefore be opened almost instantaneously upon establishment of the baking circuit. Both broiling and baking units will thus be energized simultaneously, as in the embodiment of FIGURE 6, until preheating is completed and switch 26 is opened in response to the signal from detector and transmitter unit 22 that the oven is approaching the selected temperature. Opening of switch 26 breaks the circuit through bimetal 154, thus allowing it to flex to the position in which switch 150 is closed as indicated in FIGURE 18. This establishes a circuit from L1 through switch 150, line 158 and inside heater 90 of switch 27 to N, thereby supplying supplemental heat to this switch to cause it to open as in the embodiment of FIGURE 6, and the broiler unit will thus be subjected to this supplemental control to provide percentage top heat after preheating is completed, as in the embodiment of FIGURE 6.

The basic difference in operation between the embodiment of FIGURE 18 and that of FIGURE 6 lies in the fact that the embodiment of FIGURE 18 not only supplies supplemental heat through heater 90 to open the broiler circuit at switch 27 whenever the baking circuit is opened at switch 26, but at any other time when a break occurs in the baking circuit, as for example by burning out of baking unit 21.

The switch 62', illustrated in FIGURES 16–18, differs slightly from that of switch 62 in FIGURES 4–6 in that switch 62' has only two positions, and one or the other of the double throw switch branches established through contacts 64 and 67 or 63 and 66 is closed in each of these positions. The fact that contacts 64 and 67 are closed in the off position of switch 62' as illustrated in FIGURE 16 does not effect the operation, however, since the circuits are open at all of the other switch contacts at this setting of the control knob.

While the invention has been described primarily in relation to only two specific embodiments, it will be evident to persons skilled in the art that it may be modified and refined in various ways. We therefore wish it to be understood that this invention is not to be limited in interpretation except by the scope of the following claims.

We claim:

1. In a temperature regulator for an electric oven including at least two electric resistance heating elements, the combination comprising a thermostat responsive to oven temperature, a switch controlled by said thermostat for controlling energization of one of said heating elements by movement of said switch between closed and open positions and maintaining a substantially uniform oven temperature by the resulting intermittent energization, a separate switch controlling the energization of another of said heating elements, manually operable means controlling closure of both of said switches to energize both of said heating elements during a preheat period, and current-operable means to open and close said second switch in response to opening and closing of said first switch by said thermostatic means, said heating elements and their respective switches being in separate circuits whereby each switch carries only a portion of the total load.

2. In a temperature regulator for an electric oven including at least two electric resistance heating elements, the combination comprising a thermostat responsive to oven temperature, a switch controlled by said thermostat for controlling energization of one of said heating elements by movement of said switch between closed and open positions and maintaining a substantially uniform oven temperature by the resulting intermittent energization, a separate switch controlling the energization of another of said heating elements, manually operable means controlling closure of both of said switches to energize both of said heating elements during a preheat period, means to open said second switch in response to opening of said first switch by said thermostatic means, and means to reclose said second switch in response to reclosing of said first switch, said heating elements and their respective switches being in separate circuits whereby each switch carries only a portion of the total load.

3. In a temperature regulator for an electric oven including at least two electric resistance heating elements, the combination comprising a thermostat responsive to oven temperature, a switch controlled by said thermostat for controlling energization of one of said heating elements by movement of said switch between closed and open positions and maintaining a substantially uniform oven temperature by the resulting intermittent energization, a separate switch controlling the energization of another of said heating elements, manually operable means controlling closure of both of said switches to energize both of said heating elements during a preheat period, and electrothermal means to open said second switch at the conclusion of the preheating operation, and to reclose said second switch in response to reclosing of said first switch, said heating elements and their respective switches being in separate circuits whereby each switch carries only a portion of the total load.

4. In a temperature regulator for an electric oven including an electric resistance heating element, the combination comprising a thermostat responsive to oven temperature, a cycling switch in circuit with said heating element, and comprising a bimetal arm, an electric resistance switch heater in circuit with said switch and in heat exchange relation with said bimetal arm, and switch contacts relatively movable between closed and open positions in response to heating of said bimetal arm by said switch heater, means for closing said cycling switch and adjusting the ratio of on to off time in the cycling thereof to thereby establish a desired ratio of on to off time in the cyclic energization of said heating element, and means responsive to operation of said thermostat upon attainment of a high oven temperature for opening said cyclic switch independently of its normal cyclic opening and closing as established by said adjusting means, said last-named means comprising a further switch heater mounted in heat exchange relationship with said bimetal arm.

5. A temperature regulator as defined in claim 4, in which said thermostat is interconnected with means to establish a short circuit around said further switch heater at ordinary oven operating temperatures, but includes means to break said short circuit and thereby establish energization of said further switch heater upon attainment of higher oven temperature.

6. In a temperature regulator for an electric oven including at least two electric resistance heating elements, the combination comprising a thermostat responsive to oven temperature, a switch controlled by said thermostat and in circuit with one of said heating elements to control the energization thereof, a separate switch in circuit with another of said heating elements to control the energization thereof, and current-operable means for opening and closing said separate switch included within a circuit controlled by the contacts of said first switch, said heating elements and their respective switches being in separate circuits whereby each switch carries only a portion of the total load.

7. A temperature regulator as defined in claim 6, in which said separate switch includes a thermally-responsive actuating member and in which said current-operable means is an electric resistance switch heater mounted in heat exchange relationship to said actuating member and in which said switch heater is short-circuited by the contacts of the first-mentioned switch when these contacts are in closed position.

8. A temperature regulator as defined in claim 6, in which said separate switch is a thermally operable cycling switch and in which an electric resistance switch heater in circuit with said separate switch is mounted in heat exchange relationship to a thermally responsive element of said separate switch to control the cycling thereof.

9. A temperature regulator as defined in claim 8, in which the relative movements of the contacts of said separate switch between open and closed positions are controlled by a bimetal arm in response to energization of said switch heater.

10. In a temperature regulator for an electric oven including at least two electric resistance heating elements, the combination comprising a thermostat responsive to oven temperature, a switch in circuit with one of said heating elements and controlled by said thermostat for controlling energization of said one of said heating elements by movement between closed and open positions in response to increasing and decreasing oven temperature, a cycling switch in circuit with another of said heating elements and comprising a bimetal arm, an electric resistance switch heater in circuit with said cycling switch and in heat exchange relation with said bimetal arm, and switch contacts relatively movable between closed and open positions in response to heating of said bimetal arm by said switch heater, means for closing said cycling switch and adjusting the ratio of on to off time in the cycling thereof to thereby establish a desired ratio of on to off time in the cyclic energization of said other of said heating elements, and means responsive to the operation of said first-mentioned switch for decreasing the ratio of on to off time in the further movement of said cycling switch between open and closed positions, said heating elements and their respective switches being in separate circuits whereby each switch carries only a portion of the total load.

11. A temperature regulator as defined in claim 10, in which said last-mentioned means is a further switch heater mounted in heat exchange relation to said bimetal arm.

12. A temperature regulator as defined in claim 11, in which said further switch heater forms a part of an electric heating circuit which is short-circuited by said first-mentioned switch when the latter is in closed position.

13. In a temperature regulator for an electric oven including at least two electric resistance heating elements, the combination comprising a thermostat responsive to oven temperature, a switch controlled by said thermostat for controlling energization of one of said heating elements by movement of said switch between closed and open positions and maintaining a substantially uniform oven temperature by the resulting intermittent energization, a separate switch controlling the energization of another of said heating elements, said heating elements and their respective switches being in separate circuits whereby each switch carries only a portion of the total load, manually operable means controlling closure of both of said switches to energize both of said heating elements simultaneously during a preheat period, current-operable means to open said second switch at the conclusion of the preheating operation, and common manual control means for moving the coacting contacts of said respective switches into pre-selected overclosed relationship to each other.

14. A temperature regulator as defined in claim 13, including a further switch in circuit with one of said heating elements but not with the other, and means for closing said further switch simultaneously with said first two switches.

15. A temperature regulator as defined in claim 14, including still further switch connections for completing the circuit energizing said other heating element through said first switch at one setting of said further switch connections, and for completing said circuit independently of said first switch at another setting of said further switch connections.

16. A temperature regulator as defined in claim 13, in which said first switch is thermally operable to closed position in response to current flowing through an electric resistance heater in heat exchange relation therewith.

17. In a temperature regulator for an electric oven including at least two electric resistance heating elements, the combination comprising a thermostat responsive to oven temperature, a switch controlled by said thermostat in circuit with one of said heating elements to control the energization thereof, a cycling switch in circuit with another of said heating elements, means for closing said cycling switch and adjusting the ratio of on to off time in the cycling thereof to thereby establish a desired ratio of on to off time in the cyclic energization of said other heating element, and means responsive to opening of said first-mentioned switch for decreasing the ratio of on to off time of said cycling switch in the further movement of said cycling switch between open and closed positions, said heating elements and their respective switches being in separate circuits whereby each switch carries only a portion of the total load.

18. In a temperature regulator for an electric oven including at least two electric resistance heating elements, the combination comprising a thermostat responsive to oven temperature, a switch controlled by said thermostat in circuit with one of said heating elements to control the energization thereof, a cycling switch in circuit with another of said heating elements, means for closing said cycling switch and adjusting the ratio of on to off time in the cycling thereof to thereby establish a desired ratio of on to off time in the cyclic energization of said other heating element, and means responsive to opening of said first-mentioned switch for opening said cycling switch independently of its normal cyclic opening and closing as established by said adjusting means, said heating elements and their respective switches being in separate circuits whereby each switch carries only a portion of the total load.

19. A temperature regulator in accordance with claim 18, including a further manually operable switch adapted to deenergize said one of said heating elements while leaving said first-mentioned switch in circuit.

References Cited in the file of this patent

UNITED STATES PATENTS

| | | |
|---|---|---|
| 2,385,606 | Campbell | Sept. 25, 1945 |
| 2,388,839 | Fry | Nov. 13, 1945 |
| 2,434,467 | McCormick | Jan. 13, 1948 |
| 2,498,127 | Kuhn | Feb. 21, 1950 |
| 2,666,124 | Vogelsberg | Jan. 12, 1954 |
| 2,790,056 | Fry | Apr. 23, 1957 |
| 2,824,941 | Fry | Feb. 25, 1958 |